Nov. 16, 1954  G. H. PHILLIPS  2,694,777
AUTOMATIC SAFETY VALVE FOR RAILROAD AIR BRAKE LINES
Filed April 4, 1951
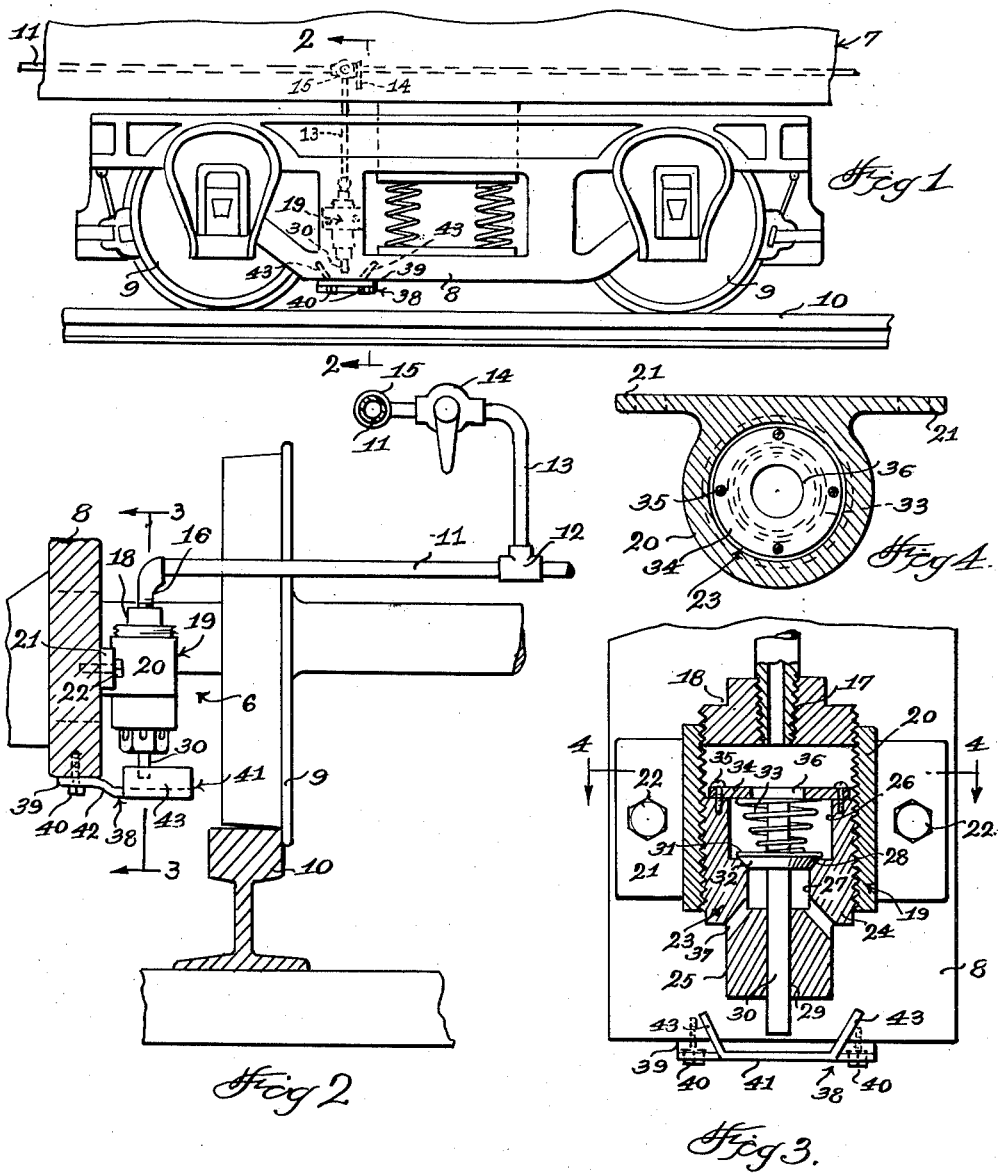
INVENTOR
GEORGE H. PHILLIPS
BY John H. Randolph
ATTORNEY

United States Patent Office 2,694,777
Patented Nov. 16, 1954

2,694,777

AUTOMATIC SAFETY VALVE FOR RAILROAD AIR BRAKE LINES

George H. Phillips, Du Bois, Pa.

Application April 4, 1951, Serial No. 219,259

6 Claims. (Cl. 246—171)

This invention relates to an attachment for use on railroad cars adapted to be connected to the air brake line and disposed whereby in the event of derailment of a car a valve will be automatically opened at the instant of derailment to release air pressure from the air brake line at a sufficient rate to apply the brakes in "emergency" to all cars of a train of which the derailed car forms a part, so that the train will be stopped in the shortest possible time and distance to minimize property damage and injury to passengers and crewmen.

More particularly, it is a primary object of the present invention to provide a safety air release attachment operated by a part of the attachment striking a rail when a car is derailed for thereby opening a release valve through which sufficient air is permitted to escape from the brake line to apply the train brakes in "emergency," which is so constructed that it will not be actuated prematurely where no derailment occurs and which will be maintained in an operative condition to insure effective functioning of the safety attachment promptly upon the occurrence of a derailment.

More particularly, it is an aim of the present invention to provide a safety attachment of the aforedescribed character which is so constructed that the air release means thereof will be protected under normal operating conditions from obstructions existing along a right-of-way, deep snow, flying objects and other commonly occurring conditions to prevent operation of the device under such conditions to apply the train brakes.

A further object of the invention is to provide an attachment which is so constructed that it will be protected to a considerable extent from moisture and dirt thrown up by the car wheels and which would otherwise cause rust or corrosion possibly preventing operation of moving parts of the attachment required to effect application of the brakes in the event of a derailment.

Still a further object of the invention is to provide an attachment having means for protecting the working parts thereof from being struck and bent by foreign objects and being thereby rendered incapable of functioning to apply the brakes in the event of a derailment.

Various other objects and advantages of the invention will hereinafter become more fully apparent from the following description of the drawing, illustrating a presently preferred embodiment thereof, and wherein:

Figure 1 is a fragmentary side elevational view of a portion of a railroad car showing the safety attachment applied thereto;

Figure 2 is an enlarged fragmentary transverse vertical sectional view taken substantially along a plane as indicated by the line 2—2 of Figure 1;

Figure 3 is an enlarged vertical sectional view through the valve taken substantially along a plane as indicated by the line 3—3 of Figure 2;

Figure 4 is a horizontal sectional view of the valve taken substantially along a plane as indicated by the line 4—4 of Figure 3, and Figure 5 is a perspective view of one element of the attachment.

Referring more specifically to the drawing, for the purpose of illustrating a preferred application and use of the automatic safety attachment, designated generally 6 and comprising the invention, a portion of a railroad car is illustrated in Figures 1 and 2 and designated generally 7 including a part of a wheeled truck of the car including one side frame 8 thereof which is spaced outwardly from a pair of longitudinally aligned wheels 9 of the truck which engages a rail 10. Likewise, the side frame 8 is spaced outwardly from and disposed above the rail 10, as seen in Figure 2. A portion of the air brake line or conduit 11 is shown extending longitudinally of the car 7. The parts 7 to 11 are all of conventional construction and are shown and briefly described merely to illustrate the application and use of the safety attachment 6. Furthermore, it will be understood as the description proceeds that each truck of each car of a train of cars is provided with a safety attachment 6 at each side thereof.

The safety attachment 6 includes a conduit 11 having a T-joint 12 intermediate of its ends the lateral nipple of which connects to one end of a flexible conduit 13. The opposite end of the flexible conduit 13 is connected to one end of a manually controlled valve or cutout cock 14, the opposite end of which is connected to the lateral nipple of a T-joint 15 which is interposed in the brake line 11 so that air from the brake line will flow through the open cock 14, flexible conduit 13 and into the conduit 11. As seen in Figure 2, the conduit 11 extends transversely of the car 7 and each end thereof, only one end of which has been disclosed, terminates in a downturned threaded portion 16 which is threaded into a bore 17 which extends through an externally threaded plug 18.

The plug 18 constitutes a part of a valve, designated generally 19, which includes an internally threaded barrel or cylinder 20 into the upper end of which the plug 18 is threaded. The barrel 20 is provided with laterally extending apertured flanges 21 which are preferably formed integral therewith and which combine to form a mounting bracket which engages against the inner side of the truck side frame 8 and is secured thereto by fastenings 22 which extend through the openings of the flanges 21 and are anchored in the frame member 8. The valve 19 includes a valve body, designated generally 23, having an enlarged externally threaded upper end 24 and a restricted lower end 25. The body portion 24 is threaded into the lower end of the barrel 20 and the portion 25 depends from beneath the barrel 20. The portion 24 is internally recessed to provide a chamber having a large upwardly opening upper end 26 and a restricted lower end 27 which opens upwardly into the bottom of the chamber 26. The bottom of the chamber 26 thus defines an annular upwardly facing surface around the chamber portion 27 the inner edge of which is beveled to provide an annular beveled valve seat 28. The body portion 25 is provided with a central bore 29 which extends longitudinally therethrough and the upper end of which opens into the chamber portion 27, axially thereof. The bore 29 forms a guide for a valve stem 30 which is reciprocably mounted therein. A valve element 31 is secured to the stem 30 near its upper end and has a beveled annular under surface 32 which is sized and shaped to seat flush against the valve seat 28. An expansion coiled spring 33 is mounted on the upper side of the valve element 31 around the upper end of the stem 30 and extends upwardly therefrom within the chamber portion 26. An annular retaining member 34 is disposed on the upper end of the valve body 23 and is secured thereto by fastenings 35 and forms a seat for the upper end of the spring 33, the upper convolution of which seats against the underside of the retaining member 34 around its opening 36. Accordingly, the spring 33 is held under tension by the retaining member 34 to retain the valve element 31 seated against the valve seat 28 to thereby normally retain the valve 19 in a closed position. The valve body portions 24 and 25 are provided with a plurality of circumferentially spaced outlet passages 37 having upper ends opening into the chamber portion 27 and lower ends opening outwardly of the body portion 25, below the body portion 24, said passages extending downwardly and outwardly from the chamber portion 27. The combined cross sectional size of the passages 37 is substantially greater than the cross sectional size of the bore of the conduit 11 and the opening 36 is likewise substantially larger than the bore of said conduit 11.

A protector member, designated generally 38, comprises a strip of relatively rigid material which is preferably of a width not much less than its length and which is provided with a substantially flat apertured end 39 which is disposed against the underside of the frame portion 8 and secured thereto by fastenings 40 which extend upwardly through the openings thereof and are anchored in the frame member 8. The protector 38 extends inwardly from the frame member 8 and has an inner end, designated generally 41, which is downwardly offset relatively to the end 39. The ends 39 and 41 are connected by an integral inclined intermediate portion 42 of the protector 38. The portion 41 is slit transversely from its side edges to provide wing members or flanges 43 which are bent upwardly and which extend upwardly in diverging relationship to one another, preferably at angles of about 45°. The plate portion 41 is disposed beneath the valve 19 and the lower exposed end of the valve stem 30 extends downwardly into the space between the flanges or wings 43, so as to be shielded thereby, as illustrated in Figures 1 and 2. The inner end of the protector 38 is disposed above and spaced outwardly slightly from the rail 10 which is disposed adjacent thereto.

It will be understood that the opposite end, not shown, of the conduit 11 is similarly connected to a valve 19, not shown, attached to the other frame member 8 and is similarly associated with another protector member 38, likewise not shown.

The protector 38 is sufficiently rigid so that it will not be bent or damaged in striking snow, ice and other obstructions along a railroad right-of-way or by being struck by stones or other objects thrown up by the wheels 9 and will thus protect the exposed lower end of the valve stem 30 to prevent the valve stem from being displaced upwardly to unseat the valve element 31 and will likewise prevent the valve stem 30 from being bent and which would prevent it from moving upwardly. Additionally, the protector 38, particularly the wings or flanges 43 thereof, will protect the valve stem and valve from moisture and dirt thrown up by the wheels and from the railroad right-of-way to minimize rust and corrosion on the stem and valve and to prevent clogging of the passages 37. However, should one of the wheels 9 be derailed from the rail 10, in which case the wheel 9 would be displaced from left to right of its position of Figure 2, the valve 19 would then be actuated to assume an open position. This would occur due to the fact that the wheel 9 would move to the right of its position of Figure 2 at least three inches before disengaging the head of the rail 10, which movement would be sufficient to place the protector portion 41 over the rail 10. When the wheel 9 thereafter drops about six inches onto the ties, the protector portion 41 will strike the rail head before the wheel 9 hits the ties and will be bent upwardly by its engagement therewith to force the stem 30 upwardly in the valve body 23 to thereby elevate and unseat the valve element 31. Further, the bent up portion 41 of the protector 38 will retain the valve element 31 in an unseated position so that air can escape freely through the valve outwardly of its outlet ports or passages 37 in sufficient quantity from the brake line 11 so that all of the brakes of a train of which the car 7 forms a part will be applied in "emergency" to thereby automatically stop the train as quickly as possible to avoid a serious train wreck. It will likewise be obvious that if the car 7 were derailed in the other direction a safety attachment 6, not shown, mounted opposite to the attachment 6 as illustrated in Figure 2 would function in the same manner to cause the application of the brakes in "emergency."

Various modifications and changes are contemplated and may obviously be resorted to, without departing from the spirit or scope of the invention as hereinafter defined by the appended claims.

I claim as my invention:

1. A safety attachment for railroad cars comprising a normally closed valve having an upper end adapted to be connected to an air brake line of a train and adapted to be secured in an upright position to a part of a railroad car outwardly of and above a rail, said valve including a slidably mounted valve stem displaceable upwardly to unseat and open the valve and having an exposed lower end, and a stiff protector member having one end adapted to be rigidly secured to a part of the car and an opposite end extending inwardly therefrom and terminating above and outwardly of the adjacently disposed rail, said last mentioned, free end of the protector member being disposed beneath and spaced from the lower exposed end of the valve stem and being adapted to be bent upwardly by engagement with the adjacent rail upon derailment of the car to thereby engage and force the valve stem upwardly to unseat and open the valve and to maintain the valve in an open position.

2. A safety attachment as in claim 1, said last mentioned, free end of the protector plate being relatively wide and having upwardly extending portions at its side edges forming shields between which the exposed end of the valve stem is disposed and by which the stem portion and valve are shielded from obstructions and flying objects.

3. A safety attachment as in claim 1, said last mentioned end of the protector member having upwardly extending shield portions adjacent its side edges disposed in advance of and behind the valve, relatively to the direction of travel of the car.

4. A safety attachment as in claim 1, the last mentioned, free end of the protector member having integral upwardly extending shields at its side edges between which the exposed end of the valve stem is disposed, said shields being disposed in upwardly diverging relationship to one another.

5. A safety attachment as in claim 1, said valve including a body provided with a bottom portion forming a guide for the valve stem, said valve body having a plurality of circumferentially spaced outlet ports formed therein above and around said valve stem guide, said outlet ports having a combined cross sectional size greater than the bore of a conduit connecting the valve to the air brake line to provide an unimpeded escape for the air through the valve when the valve is in an open position.

6. A safety attachment as in claim 1, said valve including a barrel having mounting bracket means, a plug detachably mounted in the upper end of said barrel and connected to a conduit leading from the brake line, a valve body detachably mounted in and extending downwardly from the lower end of said barrel, said valve stem being slidably mounted in and depending from the lower end of said valve body, said valve body having an upwardly opening valve seat and a plurality of discharge ports disposed beneath the valve seat and above and around the lower end of the valve body, a valve element normally seating on said valve seat and displaceable upwardly to an open position, said valve body having a cavity loosely accommodating said valve element, a spring seated on the valve element and disposed in said cavity and normally retaining the valve element in a closed position, and a spring stop and retainer detachably secured to the upper end of said valve body against which the upper end of said spring seats and having a central opening communicating with the valve body cavity.

References Cited in the file of this patent

UNITED STATES PATENTS

| Number | Name | Date |
|---|---|---|
| 341,573 | Harrington | May 11, 1886 |
| 924,742 | Couch et al. | June 15, 1909 |
| 1,084,391 | Boyd | Jan. 13, 1914 |
| 1,462,254 | Votaw | July 17, 1923 |